United States Patent
Chen et al.

(10) Patent No.: US 12,154,283 B1
(45) Date of Patent: Nov. 26, 2024

(54) SHIP DETECTION AND TRACKING METHOD AND DEVICE

(71) Applicant: Wuhan University of Technology, Wuhan (CN)

(72) Inventors: Linying Chen, Wuhan (CN); Yamin Huang, Wuhan (CN); Pengfei Chen, Wuhan (CN); Junmin Mou, Wuhan (CN)

(73) Assignee: Wuhan University of Technology, Wuhan (CN)

( * ) Notice: Subject to any disclaimer, the term of this patent is extended or adjusted under 35 U.S.C. 154(b) by 0 days.

(21) Appl. No.: 18/393,732

(22) Filed: Dec. 22, 2023

(30) Foreign Application Priority Data

May 5, 2023 (CN) .......................... 202310498773.6

(51) Int. Cl.
*G06K 9/00* (2022.01)
*G06T 7/246* (2017.01)
*G06T 7/277* (2017.01)

(52) U.S. Cl.
CPC .............. *G06T 7/277* (2017.01); *G06T 7/246* (2017.01); *G06T 2207/10016* (2013.01); *G06T 2207/20081* (2013.01); *G06T 2207/20084* (2013.01)

(58) Field of Classification Search
CPC ..................... G06T 7/277; G06T 7/246; G06T 2207/10016; G06T 2207/20081; G06T 2207/20084
USPC .......................................................... 382/103
See application file for complete search history.

(56) References Cited

PUBLICATIONS

Long, Yinfu, et al. "Accurate Identification of Infrared Ship in Island-Shore Background Based on Visual Attention." 2022 IEEE Asia-Pacific Conference on Image Processing, Electronics and Computers (IPEC). IEEE, 2022. (Year: 2022).*
Jie, Yang, et al. "Ship detection and tracking in inland waterways using improved YOLOv3 and Deep Sort." Symmetry 13.2 (2021): 308. (Year: 2021).*
Wen, Junhui, et al. "Multi-Object Detection for Inland Ship Situation Awareness Based on Few-Shot Learning." Applied Sciences 13.18 (2023): 10282. (Year: 2023).*
Li, Sen, Xiongjun Fu, and Jian Dong. "Improved ship detection algorithm based on YOLOX for SAR outline enhancement image." Remote Sensing 14.16 (2022): 4070. (Year: 2022).*

(Continued)

*Primary Examiner* — Jonathan S Lee
(74) *Attorney, Agent, or Firm* — Hemisphere Law, PLLC; Zhigang Ma (57) ABSTRACT

Disclosed is a ship detection and tracking method and device, the method comprises: pre-training a yolov5s network model with a first preset number of high-speed moving object datasets to obtain an initial ship detection model; adding a preset attention mechanism to the initial ship detection model to obtain a transitional ship detection model; inputting a second preset number of annotated ship datasets into the initial ship detection model with the preset attention mechanism for training to obtain a target ship detection model; inputting an original ship video frame into the target ship detection model, and outputting the position information of the ship to be tracked; performing ship video image tracking on the ship to be tracked according to the position information. This disclosure performs pre-training, which only requires a small amount of annotated ship data to determine the target ship detection model, achieving video image tracking of the target ship.

11 Claims, 7 Drawing Sheets

(56) References Cited

PUBLICATIONS

Wuhan University of Technology (Applicant), Claims for CN202310498773.6 (allowed), May 5, 2023.
CNIPA, Notification to grant patent right for invention in CN202310498773.6, Oct. 24, 2023.

* cited by examiner

SHIP DETECTION AND TRACKING METHOD AND DEVICE

FIELD OF THE DISCLOSURE

The disclosure relates to the technical field of ship detection and tracking, in particular to a ship detection and tracking method and device.

BACKGROUND

With the rapid development of artificial intelligence technology and high-speed processors, the development of autonomous navigation technology has been on a large scale. Ships with autonomous navigation technology have begun to be tested, and autonomous navigation ships with commercial value will enter operational phase in the next few years. Situation perception is one of core technologies of autonomous navigation of ships and is a foundation for realizing autonomous navigation of ships. In an autonomous navigation environment, vision-based ship detection and tracking is a part of ship situation perception, and machine vision perception technology is to receive environmental information through visual sensors such as cameras and then processing the information so as to obtain a quantitative description of objects in the environment. Machine vision perception technology include contents such as image segmentation, object extraction, feature extraction, and object recognition. For unmanned ships during autonomous navigation, it is important to obtain the location, size, and category of obstacles along the navigation route. Therefore, relatively mature ship target detection and tracking technology is a prerequisite for intelligent maritime safety.

In existing technologies, ship target detection and tracking technology generally first collects image or video data of ship navigation, and then establishes and trains a ship recognition model. Then, annotating the collected image or video data of ship navigation, and finally, recognizing and tracking the ship by the annotated data with high-quality and the trained ship recognition model.

However, there are relatively few datasets that can be directly used in existing technologies, so it requires more time to annotate the data. On the other hand, using a general training strategy requires a large amount of data with different annotation types. The generalization ability of the trained model is relatively poor, and the application scenarios of the model are affected by the annotation quality of the dataset. Datasets with different annotation qualities make the training accuracy of the model poor.

SUMMARY

The purpose of this disclosure is to provide a method and device for ship detection and tracking to solve the problem that the model generalization ability of ship detection and tracking in the existing technology is poor, and a large number of well-annotated ship data is needed to improve the detection accuracy of the model.

This disclosure provides a method for ship detection and tracking, comprising:
  pre-training a yolov5s network model with a first preset number of high-speed moving object datasets to obtain an initial ship detection model, motion characteristics of the high-speed moving objects are similar to those of ships;
  adding a preset attention mechanism to the initial ship detection model to obtain a transitional ship detection model;
  based on a transfer learning strategy, inputting a second preset number of annotated ship datasets into the initial ship detection model with the preset attention mechanism for training to obtain a target ship detection model;
  inputting an original ship video frame into the target ship detection model, and outputting the position information of the ship to be tracked;
  based on a preset tracking algorithm, performing ship video image tracking on the ship to be tracked according to the position information.

This disclosure also provides a ship detection and tracking device, comprising:
  a pre-training module which is used to pre-train a yolov5s network model with a first preset number of high-speed moving object datasets to obtain an initial ship detection model, motion characteristics of the high-speed moving objects are similar to those of ships;
  an attention module, which is used to add a preset attention mechanism to the initial ship detection model to obtain a transitional ship detection model;
  a transfer training module, which is used to input a second preset number of annotated ship datasets into the initial ship detection model with the preset attention mechanism for training to obtain a target ship detection model based on a transfer learning strategy;
  a position detection module, which is used to input an original ship video frame into the target ship detection model, and outputting the position information of the ship to be tracked;
  a tracking module, which is used to perform ship video image tracking on the ship to be tracked according to the position information based on a preset tracking algorithm.

This disclosure also provides an electronic device, comprising a memory and a processor, wherein:
  the memory is used for storing programs;
  the processor is coupled with the memory for executing the program stored in the memory to implement the steps of the ship detection and tracking method.

This disclosure also provides a computer-readable storage medium, which is used to store programs or instructions that can be read by a computer, when the program or instruction is executed by a processor, it can implement the steps of the ship detection and tracking method.

Compared with the prior art, the beneficial effects of this disclosure are: pre-training a yolov5s network model through high-speed moving object datasets to obtain an initial ship detection model suitable for target ship detection. Then, through a transfer learning strategy, only a small amount of annotated ship data is needed to train the improved initial ship detection model to obtain a target ship detection model with good generalization ability. Then, realizing video image tracking of the target ship by the original ship video and a preset tracking algorithm, which can accurately track the video image of the target ship when the annotated ship data is small.

BRIEF DESCRIPTION OF THE DRAWINGS

Accompanying drawings are for providing further understanding of embodiments of the disclosure. The drawings form a part of the disclosure and are for illustrating the principle of the embodiments of the disclosure along with the literal description. Apparently, the drawings in the description below are merely some embodiments of the disclosure, a person skilled in the art can obtain other drawings according to these drawings without creative efforts. In the figures.

DETAILED DESCRIPTION OF PREFERRED EMBODIMENTS

The technical solutions in the embodiments of the application will be described clearly and completely in combination with the drawings in the embodiments of the application.

This disclosure provides a ship detection and tracking method, device, electronic device, and storage medium, which will be explained separately below.

Figure 1:
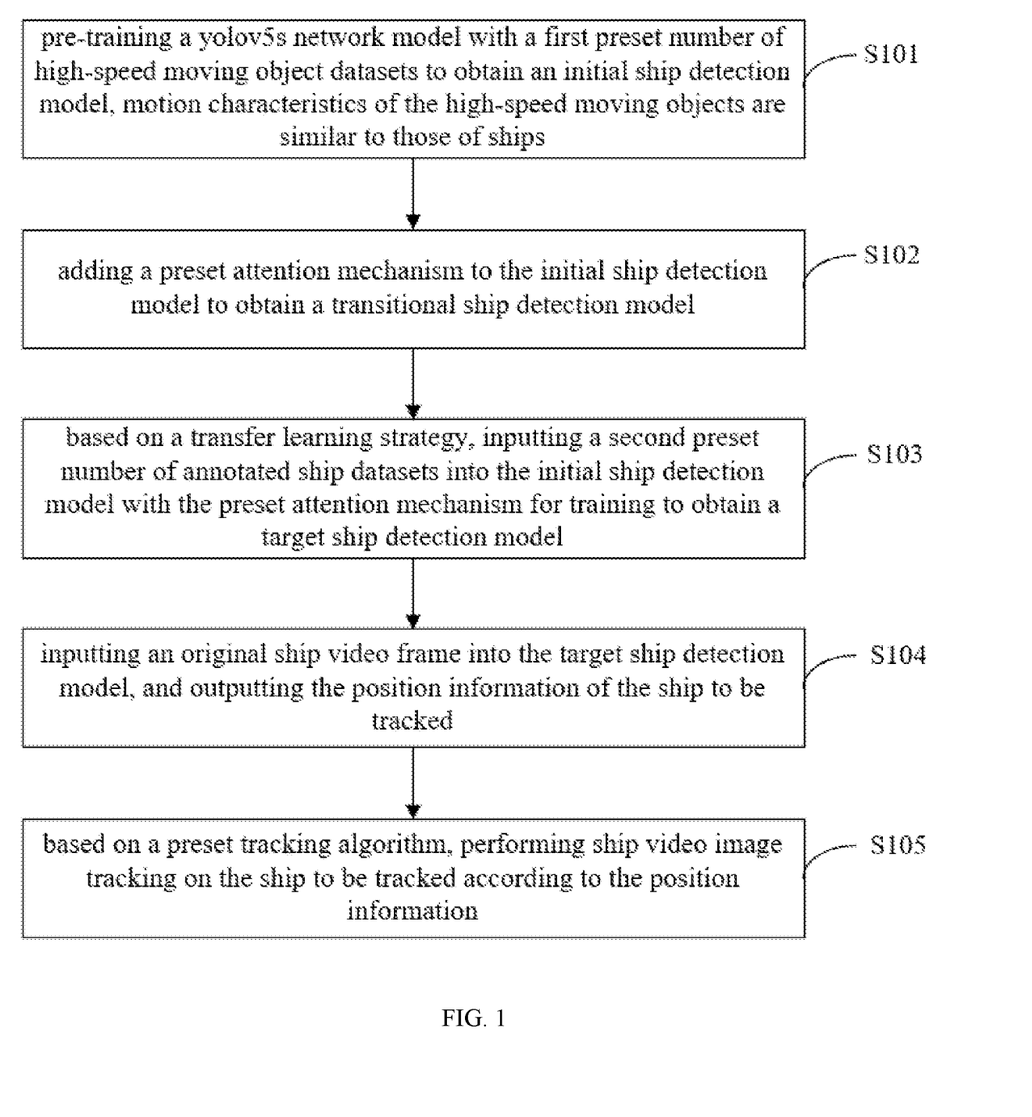
FIG. 1 is a flowchart of an embodiment of the ship detection and tracking method provided by this disclosure.

Please refer to FIG. 1, which is a flowchart of an embodiment of the ship detection and tracking method provided by this disclosure. A specific embodiment of this disclosure discloses a ship detection and tracking method, comprising:

S101, pre-training a yolov5s network model with a first preset number of high-speed moving object datasets to obtain an initial ship detection model, motion characteristics of the high-speed moving objects are similar to those of ships;

S102, adding a preset attention mechanism to the initial ship detection model to obtain a transitional ship detection model;

S103, based on a transfer learning strategy, inputting a second preset number of annotated ship datasets into the initial ship detection model with the preset attention mechanism for training to obtain a target ship detection model;

S104, inputting an original ship video frame into the target ship detection model, and outputting the position information of the ship to be tracked;

S105, based on a preset tracking algorithm, performing ship video image tracking on the ship to be tracked according to the position information.

It should be noted that considering the limited number of ship datasets, this embodiment uses high-speed moving objects with similar ship motion characteristics as a large dataset and trains them as the input set of the original detection model.

In a preferred embodiment, the high-speed moving object can be a high-speed moving vehicle. Due to the significant similarity between the high-speed vehicle dataset and the ship dataset captured by cameras, the high-speed moving vehicle dataset will also present different image sizes due to different distances. Therefore, the UA-DETRAC high-speed dataset is selected for pre-training of the feature extraction network (i.e., the initial ship detection model).

It should also be noted that the first preset number should be much greater than the second preset number; Specifically, the first preset data can be referred to as a large amount of data, while the second preset data is a small amount of data, which represents the situation where there is a large dataset of high-speed moving objects and a small dataset of ships.

It should be noted that pre-training model refers to a pre-trained model or the process of pre-training the model, as the annotated ship dataset that can be used is not large enough, usually only a few hundred or thousands of pieces. Directly applying these data to train a network can easily lead to overfitting problems.

The preset attention mechanism is the Shuffle Attention mechanism. The improvement of the yolov5s network model lies in adding a Shuffle Attention structure in front of the SPPF module in the last layer of BackBone to integrate spatial and channel attention mechanisms, thereby improving the accuracy of ship target detection.

At present, attention mechanisms are mainly divided into two categories: spatial attention mechanism and channel attention mechanism. These two targets are used to capture pairwise pixel level relationships and inter channel dependencies. In brief, the spatial attention mechanism places more emphasis on the importance of the target spatial location, while the channel attention mechanism places more emphasis on the weight relationship between channels. The Shuffle Attention is a model that effectively combines these two attention mechanisms. This model first groups channel features to obtain sub-features of multiple groups. Then, using both spatial and inter channel attention mechanisms for each sub-feature. Finally, using the Channel Shuffle operation to fuse all sub-features to fuse features from different groups. This model effectively combines the spatial attention mechanism and the channel attention mechanism, and can improve the its detection performance on targets.

After that, a relatively small amount of annotated ship data is used to train the multi-target detection model to obtain a high-precision ship target detection model. After completing the ship detection training, the tracking ship video that needs to be detected will be tracked using the Deepsort tracking algorithm to achieve stable tracking of the target ship. Combining the above methods, a transfer learning strategy is adopted to improve the yolov5s detection network to achieve lightweight target detection of ships, and combined with the Deepsort tracking algorithm, the river or sea ship is tracked. This model has a certain generalization ability and effectively improves tracking accuracy.

Compared with the prior art, the beneficial effects of this disclosure are: pre-training a yolov5s network model through high-speed moving object datasets to obtain an initial ship detection model suitable for target ship detection. Then, through a transfer learning strategy, only a small amount of annotated ship data is needed to train the improved initial ship detection model to obtain a target ship detection model with good generalization ability. Then, realizing video image tracking of the target ship by the original ship video and a preset tracking algorithm, which can accurately track the video image of the target ship when the annotated ship data is small.

In some embodiments of this disclosure, based on a transfer learning strategy, the second preset number of annotated ship datasets are input into the transition ship detection model for training to obtain a target ship detection model, comprising:

freezing feature extraction layer of the transition ship detection model and performing iterative trainings for a first preset number of times;

thawing the feature extraction layer of the transition ship detection model, and obtaining the target ship detection model by iterative trainings for a second preset number of times.

In the above embodiments, the first preset number of times of iterative trainings are the first 30 iterative trainings, and the second preset number of times of iterative trainings are the 100 iterative trainings afterwards. Inputting the annotated ship dataset into a neural network to train the yolov5s network. In the first 30 iterative trainings, the weight parameters of all feature extraction parts (all network layers except the last Head layer) are frozen, and only the ownership weight parameters of the Head detection head are updated to obtain the initial pre-trained weight model. In the next 100 iterations, all feature extraction layers are thawed so that the yolov5s network can update all the weight parameters. Finally, the target ship detection model is obtained through pre-training, and the updated model parameters are obtained. The transfer learning strategy used in this aspect can obtain a ship detection model with certain detection accuracy and robustness under a small sample task dataset.

Figure 2:
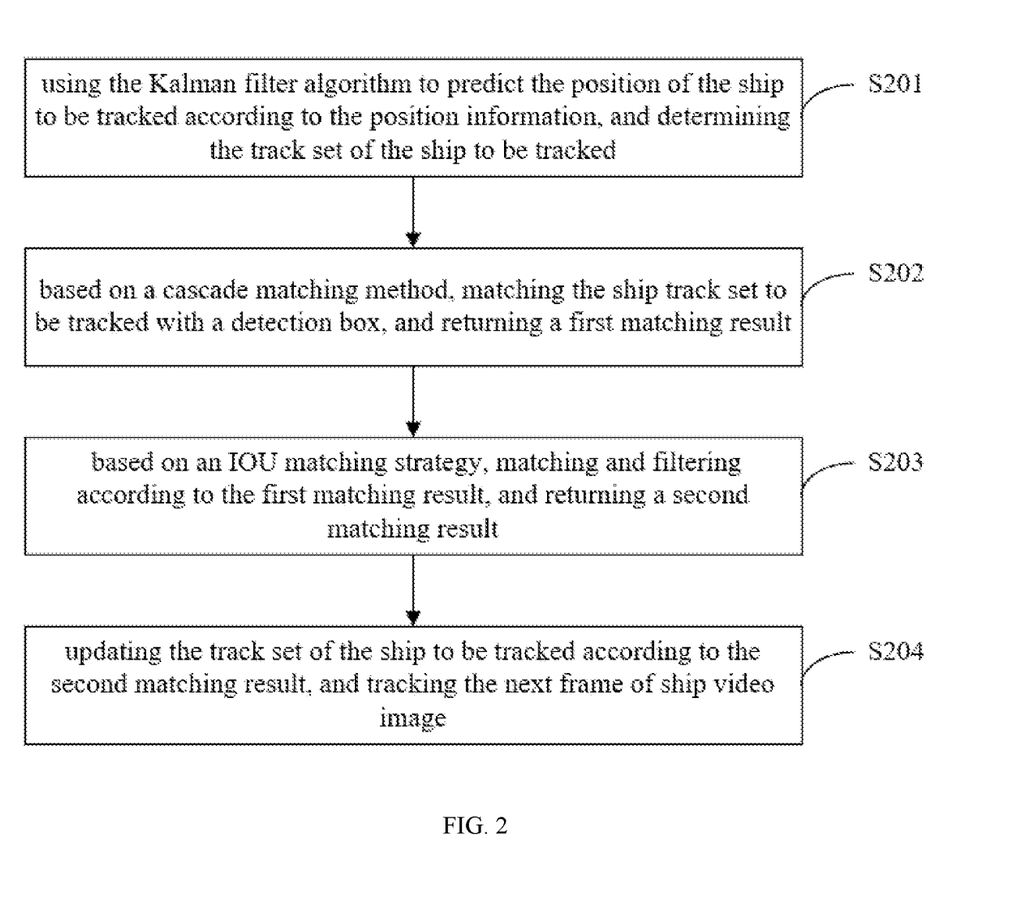
FIG. 2 is a flowchart of an embodiment of step S104 in FIG. 1.

Please refer to FIG. 2, FIG. 2 is a flow diagram of an embodiment of Step S104 in FIG. 1. In some embodiments of this disclosure, based on a preset tracking algorithm, performing ship video image tracking on the ship to be tracked based on the position information, comprising:

S201, using the Kalman filter algorithm to predict the position of the ship to be tracked according to the position information, and determining the track set of the ship to be tracked;

S202, based on a cascade matching method, matching the ship track set to be tracked with a detection box, and returning a first matching result;

S203, based on an IOU matching strategy, matching and filtering according to the first matching result, and returning a second matching result;

S204, updating the track set of the ship to be tracked according to the second matching result, and tracking the next frame of ship video image.

In the above embodiments, the preset tracking algorithm is the Deepsort tracking algorithm, which is an improvement of the Sort target tracking algorithm. The core of the Sort algorithm is Hungarian matching and Kalman filtering algorithm. In addition to the core part of the Sort algorithm, the Deepsort tracking algorithm also introduces the deep learning model ReID module to extract the appearance features of the ship to be tracked for nearest neighbor matching in the real-time target tracking process. In the current frame, the minimum cosine distance between all the feature vectors of the i-th ship to be tracked and the j-th ship to be tracked is calculated. In this disclosure, the Deepsort tracking algorithm is introduced and combined with the yolov5 ship target detection model obtained above.

It should be noted that in addition to determining the position information of the ship to be tracked in the image, a confidence level is calculated, $$C_i^j = P_r(\text{object}) * \text{IOU}_{pred}^{truth}(\text{Class Probability} * \text{IOU}),$$

where the Class Probability represents the probability $P_r$ (object) of whether the current box has an object, which indicates whether there is only a background or an object in the current box; $\text{IOU}_{pred}^{truth}$ represents that when the current box has an object, the area of the possible overlap between the box predicted by the network itself and the real box of the object, $C_i^j$ represents the confidence rate of the j-th detection box of the i-th image grid.

Figure 3:
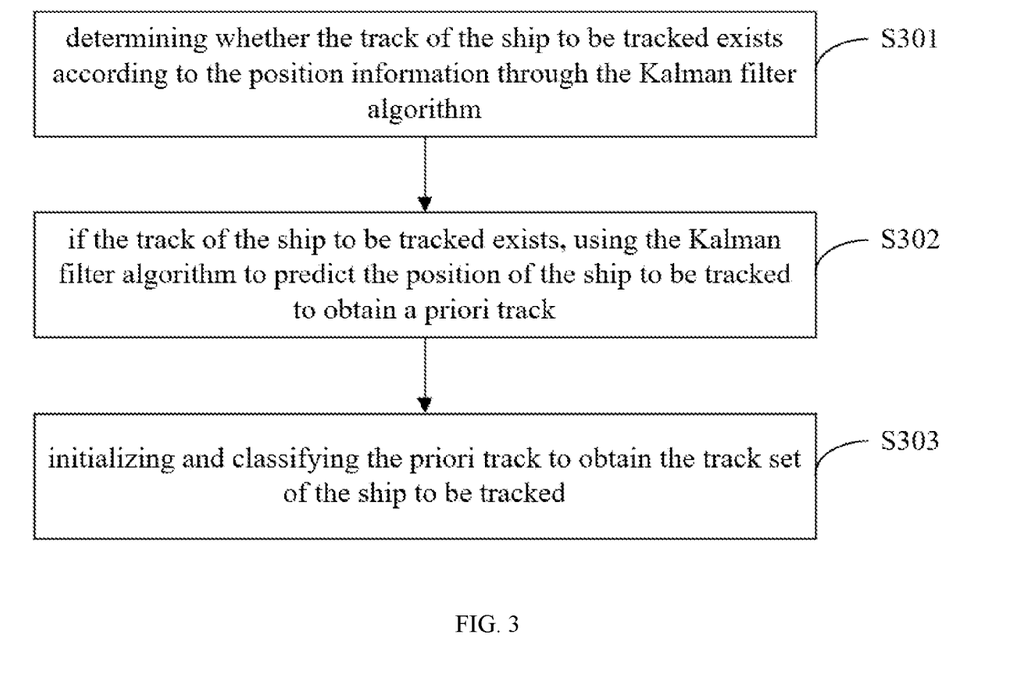
FIG. 3 is a flowchart of an embodiment of step S201 in FIG. 2.

Please refer to FIG. 3, FIG. 3 is a flow diagram of an embodiment of Step S201 in FIG. 2. In some embodiments, using the Kalman filter algorithm to predict the position of the ship to be tracked according to the position information, and determining the track set of the ship to be tracked, comprising:

S301, determining whether the track of the ship to be tracked exists according to the position information through the Kalman filter algorithm;

S302, if the track of the ship to be tracked exists, using the Kalman filter algorithm to predict the position of the ship to be tracked to obtain a priori track;

S303, initializing and classifying the priori track to obtain the track set of the ship to be tracked.

In the above embodiments, inputting the position information of the ship to be tracked in the image into the Deepsort detection and tracking network. The Kalman filter algorithm first determines whether the track of the ship to be tracked exists. If it exists, the prior probability prediction is performed on the position information of the ship to be tracked. If it does not exist, the track is abandoned.

The Kalman filter algorithm is used to predict and update the position of the ship to be tracked, and a priori track prediction is obtained. The Kalman filter algorithm update formula is as follows:

$$\hat{x}_{k|k-1} = F_k \hat{x}_{k-1|k-1}$$
$$P_{k|k-1} = F_k P_{k-1|k-1} F_k^T + Q_k$$
$$K_k = P_{k|k-1} H_k^T (H_k P_{k|k-1} H_k^T + R_k)^{-1};$$
$$\hat{x}_{k|k} = \hat{x}_{k|k-1} + K_k (z_k - H_k \hat{x}_{k|k-1})$$
$$P_{k|k} = (I - K_k H_k) P_{k|k-1}$$

where $\hat{x}_{k-1|k-1}$ denotes the state estimation at time k−1, but the observation at time k has not been received. At time k, the Kalman filter uses this estimate to predict the position of the ship to be tracked. $\hat{x}_{k|k}$ is the state estimation obtained by the new observation at time k, $z_k$ is the observation at time k, $F_k$ is the state transition matrix, $H_k$ is the observation matrix, $Q_k$ is the covariance matrix of the process noise, $R_k$ is the covariance matrix of the observation noise, and the error introduced by the sensor noise is considered. $P_{k|k-1}$ is the covariance matrix of state estimation at time k−1, $P_{k|k-1}$ is the covariance matrix of state estimation at time k, and $K_k$ is the Kalman gain.

After obtaining the priori track, the Deepsort tracking algorithm has a track set that divides the existing tracks into three states: 'Confirmed', 'Tentative', and 'Deleted'. All priori tracks will be initialized. After the initialization of the tracks, the state is 'Tentative'. If there is no matching detection box detection, the track state will become 'Deleted'. If the number of times that the track matches the detection box is greater than the threshold n_init, the track state will become 'Confirmed'. In the process of the Deepsort tracking algorithm, all tracks are updated through three states.

In some embodiments of this disclosure, based on a cascade matching method, matching the ship track set to be tracked with a detection box, and returning a first matching result, comprising:

calculating a first cost matrix according to the track set of the ship to be tracked;

based on the preset matching method, matching the track set of the ship to be tracked with the detection box according to the first cost matrix, and obtaining the first matching result.

In the above embodiments, cascade matching only matches the track with the state of 'Confirmed'. The cascade matching comprises two steps: the first step is to calculate a cost matrix, and the second step is to use the Hungarian matching method to complete the matching of the track and the detection target, and return the matching result. The output results are divided into three categories: 1, matched track and matched detection box; 2, unmatched track; 3, unmatched detection box. The cost matrix of cascade matching is combined with cosine similarity distance and Mahalanobis distance. The measurement formula of the Mahalanobis distance matching is:

$$d^{(1)}(i,j)=(d_j-y_i)^T S_i^{-1}(d_j-y_i);$$

where, $d_j$ represents the position of the j-th detection box, $y_i$ represents a predicted position of the target predicted by the i-th tracker, $S_i$ represents the covariance matrix between the detection position and the average tracking position.

The Markov distance considers the uncertainty of state measurement by calculating the standard deviation between the detection position and the average track position. Due to the failure of the Markov distance correlation method during camera motion, it leads to rapid switching of tracking target IDs. In order to ensure stable ID switching, cosine distance matching is also introduced, which combines the appearance features of the target detection box with the features extracted from the REID network. The formula is as follows:

$$d^{(2)}(i,j)=\min\{1-r_j^T r_k^{(1)} | r_k^{(i)} \in R_i\};$$

where, R is the appearance feature vector library, r is the feature vector extracted from the d-th detection box.

Finally, setting certain weights on these two features to obtain a final cost matrix:

$$c_{i,j}=\lambda d^{(1)}(i,j)+(1-\lambda)d^{(2)}(i,j);$$

where, $\lambda$ represents the weights of these two cost matrices.

The preset matching method is the Hungarian matching algorithm, which mainly matches the track and detection box by inputting the cost matrix to complete the matching. Finally, preliminary matched results, as well as unmatched tracks and unmatched detection boxes, are obtained.

Figure 4:
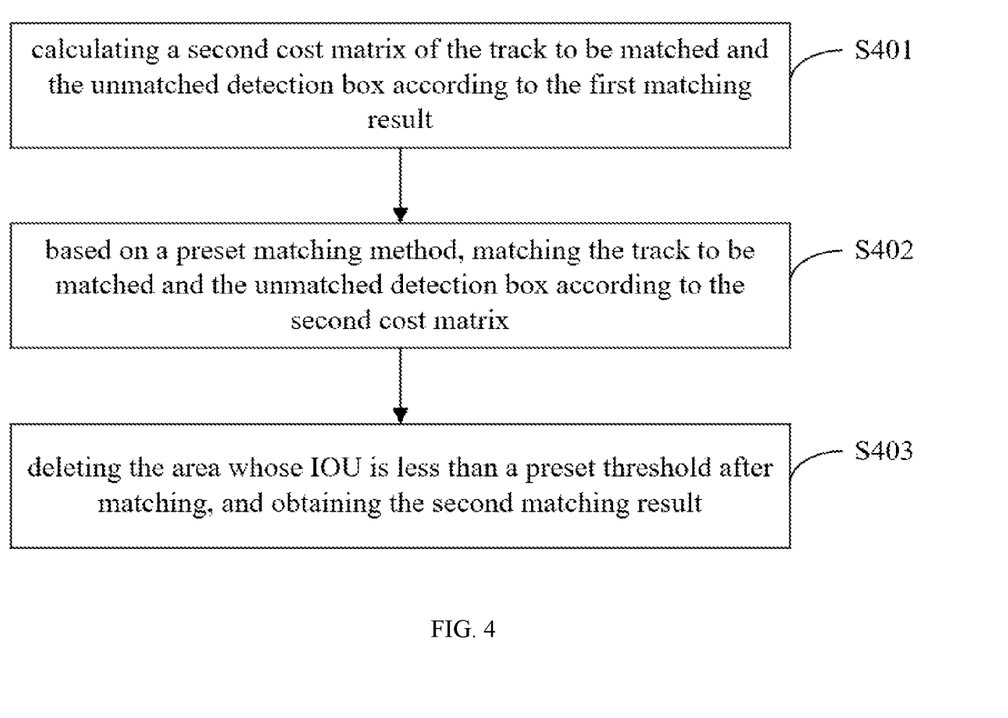
FIG. 4 is a flowchart of an embodiment of step S203 in FIG. 2.

Please refer to FIG. 4, which is a flow diagram of an embodiment of step S203 in FIG. 2. In some embodiments, based on an IOU matching strategy, matching and filtering according to the first matching result, and returning a second matching result, comprising:

S401, calculating a second cost matrix of the track to be matched and the unmatched detection box according to the first matching result;

S402, based on a preset matching method, matching the track to be matched and the unmatched detection box according to the second cost matrix;

S403, deleting the area whose IOU is less than a preset threshold after matching, and obtaining the second matching result.

In the above embodiments, for the remaining unmatched tracks and unmatched detection boxes after the cascade matching, as well as the track of all tentative states at the current k-th moment predicted by the Kalman filter algorithm at the k−1 moment, using the IOU matching strategy to solve the case where a sudden appearance change makes the cascade matching difficult to match, such as partial occlusion. Firstly, constructing all the tracks and detection boxes in the IOU directly as elements into the cost matrix (the second cost matrix) of the IOU matching, and calculating the cost matrix of the track to be matched and the unmatched detection box, and using the Hungarian algorithm to match again. Finally, filtering the matching results to delete the area where the IOU is less than the preset threshold.

It should be noted that part of the calculation process and cascade matching type of the IOU matching strategy are not described in detail. The preset threshold can be set according to actual needs, and this disclosure does not further restrict this.

Figure 5:
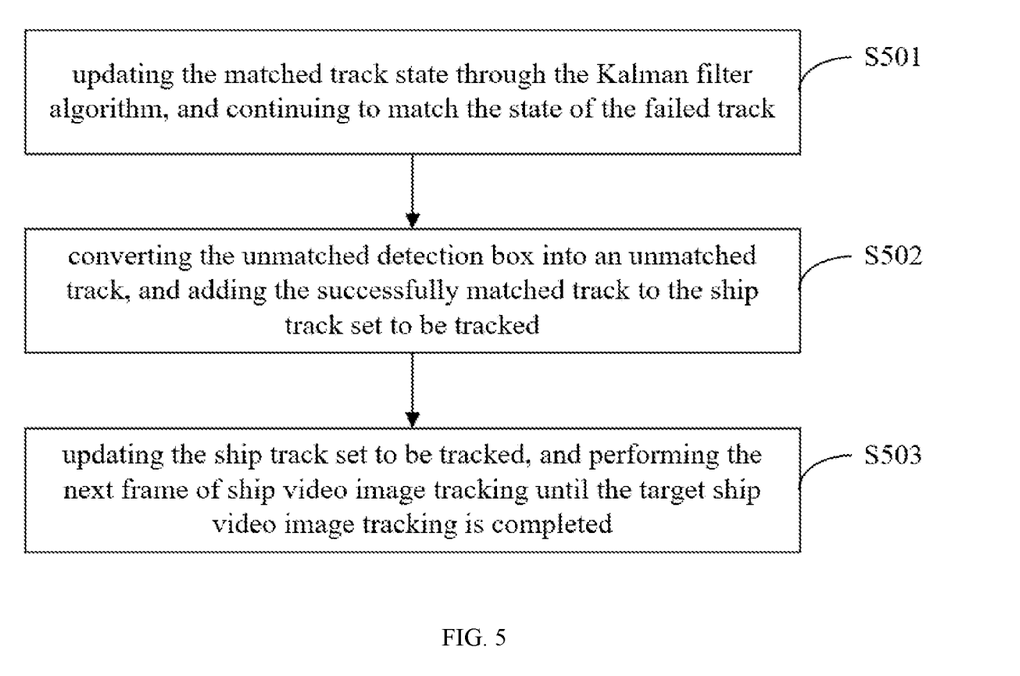
FIG. 5 is a flowchart of an embodiment of step S204 in FIG. 2.

Please refer to FIG. 5, which is a flow diagram of an embodiment of Step S204 in FIG. 2. In some embodiments, updating the track set of the ship to be tracked according to the second matching result, and tracking the next frame of ship video image, comprising:

S501, updating the matched track state through the Kalman filter algorithm, and continuing to match the state of the failed track;

S502, converting the unmatched detection box into an unmatched track, and adding the successfully matched track to the ship track set to be tracked;

S503, updating the ship track set to be tracked, and performing the next frame of ship video image tracking until the target ship video image tracking is completed.

In the above embodiments, the matched trajectory, the unmatched trajectory and the unmatched detection box are first determined. Then updating the state of the successfully matched tracks and continuing to match the state of the failed tracks. Then determining the unmatched detection box and the successfully matched track, converting the unmatched detection box into a new track, and adding the successfully matched track to the track set. Finally, updating the state of each track, deleting the confirmed lost track and updating the confirmed track set, completing all updates, and entering the next frame of detection and tracking, repeating this cycle until the ship video image tracking is finally completed.

In the accuracy evaluation of the ship detection and tracking method proposed by this disclosure, mAP (Mean Average Precision) is introduced for evaluation, that is, AP values are calculated for each category, and then averaged. AP means the accuracy value on an average PR (precision and recall) curve. For the PR curve, it is calculated by integral. The AP formula is as follows:

$$AP = \int_0^1 P(R)dR;$$

The calculating formula of mAP is as follows:

$$mAP = \frac{1}{n}\sum_{i=1}^n \int_0^1 P(R)dR;$$

The mAP @ 0.5 used is the mAP score corresponding to IoU>0.5. IoU is considered to be the coincidence degree of the target box and the prediction box (if it is 1, the target box and the prediction box completely coincide; if it is 0, the target box and the prediction box completely do not coincide).

The targets of the dataset are divided into seven categories: cargo ship, ro-ro ship, container ship, passenger ship, buoy, oil tanker, and kayak. The dataset is a total of 1615 images.

After using the training strategy of transfer learning and adding the Shuffle Attention mechanism, it is found that the detection accuracy of different types of targets has been significantly improved in ship target detection. After adding transfer learning, the model can achieve a relatively high accuracy in the case of a small sample training set. The specific test results are shown in Table 1:

TABLE 1

Accuracy comparison of ship target detection network (mAP @.5)

| Detection target type | cargo ship | ro-ro ship | container ship | passenger ship | buoy | oil tanker | kayak | ALL |
|---|---|---|---|---|---|---|---|---|
| Original network | 0.87 | 0.457 | 0.887 | 0.853 | 0.754 | 0.883 | 0.6 | 0.758 |
| Original network + shuffle attention | 0.868 | 0.499 | 0.883 | 0.848 | 0.733 | 0.904 | 0.863 | 0.80 |
| Original network + shuffle attention + Transfer learning strategies | 0.934 | 0.584 | 0.952 | 0.777 | 0.857 | 0.885 | 0.995 | 0.855 |

According to Table 1, it can be seen that adding the Deepsort tracking algorithm can achieve good ship detection results and has a relatively continuous tracking of the ships to be tracked.

Figure 6:
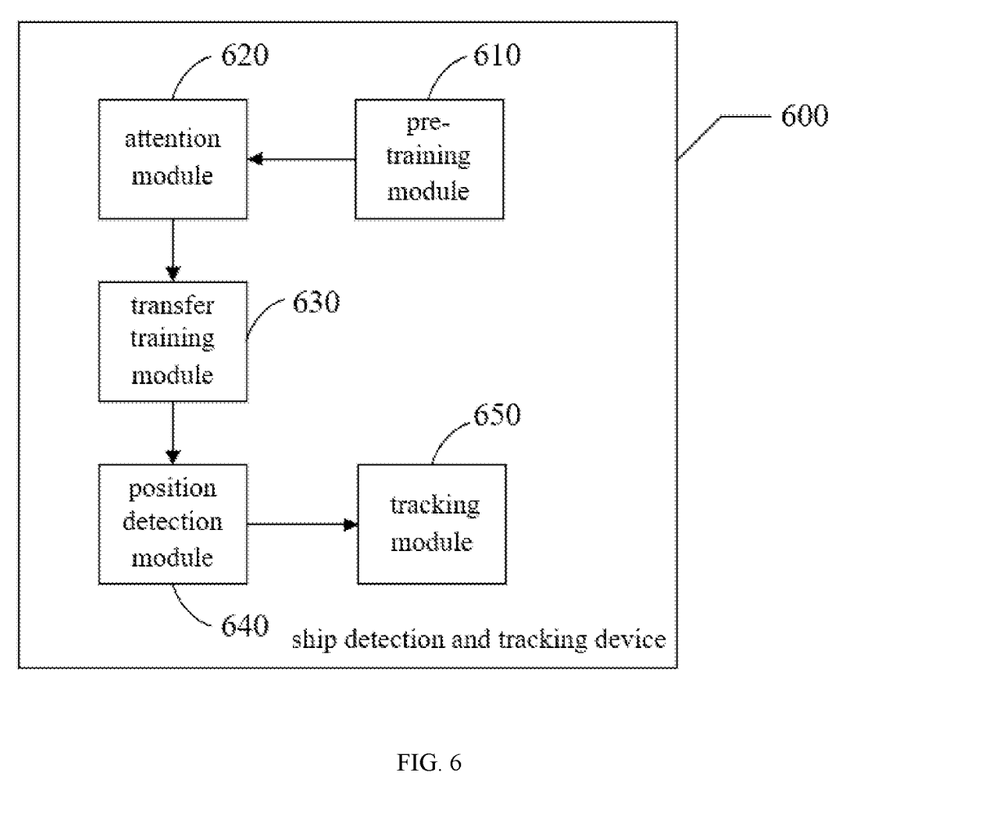
FIG. 6 is a structural schematic diagram of an embodiment of the ship detection and tracking device provided by this disclosure.

In order to better implement the ship detection and tracking method in the embodiment of this disclosure, based on the ship detection and tracking method, please refer to FIG. 6, which is a structural schematic diagram of an embodiment of the ship detection and tracking device provided by this disclosure. The embodiment of this disclosure provides a ship detection and tracking device 600, comprising:
- a pre-training module 610, which is used to pre-train a yolov5s network model with a first preset number of high-speed moving object datasets to obtain an initial ship detection model, motion characteristics of the high-speed moving objects are similar to those of ships;
- an attention module 620, which is used to add a preset attention mechanism to the initial ship detection model to obtain a transitional ship detection model;
- a transfer training module 630, which is used to input a second preset number of annotated ship datasets into the initial ship detection model with the preset attention mechanism for training to obtain a target ship detection model based on a transfer learning strategy;
- a position detection module 640, which is used to input an original ship video frame into the target ship detection model, and outputting the position information of the ship to be tracked;
- a tracking module 650, which is used to perform ship video image tracking on the ship to be tracked according to the position information based on a preset tracking algorithm.

It should be noted that the device 600 provided in the above embodiments can implement the technical solutions described in the above embodiments. The specific implementation principles of the above modules or units can be found in the corresponding content of the above method embodiments, and will not be repeated here.

Figure 7:
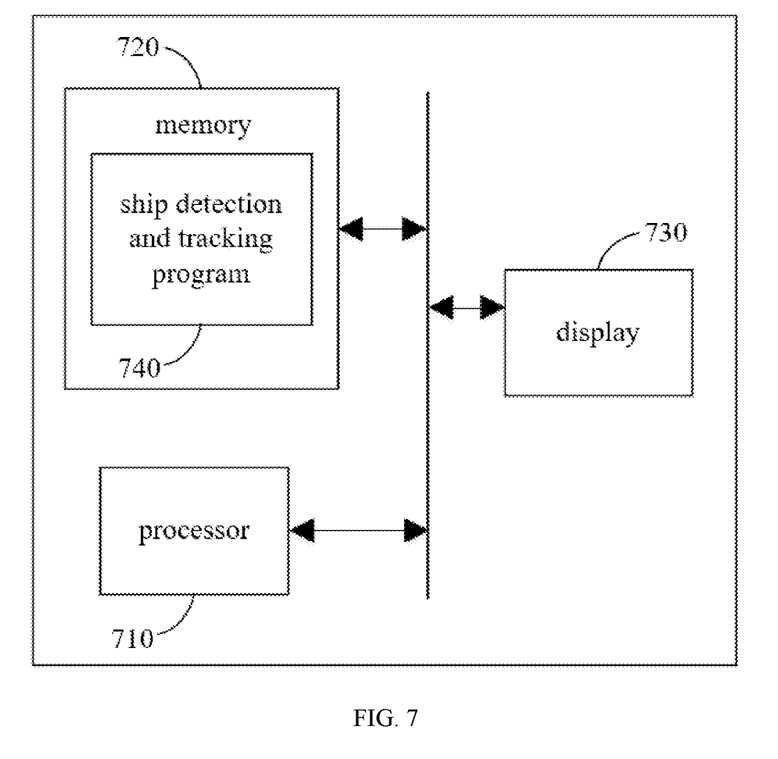
FIG. 7 is a structural schematic diagram of the electronic device provided in the embodiment of this disclosure.

Please refer to FIG. 7, which is a schematic diagram of the structure of the electronic device provided in the embodiment. Based on the ship detection and tracking method, this disclosure also provides a ship detection and tracking device, which can be a mobile terminal, a desktop computer, a laptop, a handheld computer, a server, and other computing devices. The ship detection and tracking device includes a processor 710, a memory 720, and a display 730. FIG. 7 only shows some components of the electronic device, but it should be understood that it is not required to implement all the components shown, and more or fewer components can be implemented as an alternative.

The memory 720 can be an internal storage unit of ship detection and tracking device in some embodiments, such as a hard disk or memory of the ship detection and tracking device. In other embodiments, the memory 720 can also be an external storage device for ship detection and tracking device, such as a plug-in hard disk, a Smart Media Card (SMC), a Secure Digital (SD) card, a Flash Card, etc. provided on the ship detection and tracking device. Furthermore, the memory 720 can also include both internal storage units of ship detection and tracking device and external storage devices. The memory 720 is used to store application software and various data installed on ship detection and tracking device, such as program codes for installing ship detection and tracking device. The memory 720 can also be used to temporarily store data that has been or will be output. In one embodiment, the memory 720 stores a ship detection and tracking program 740, which can be executed by the processor 710 to implement the ship detection and tracking methods of the embodiments of the present application.

In some embodiments, the processor 710 can be a Central Processing Unit (CPU), a microprocessor, or other data processing chip used to run program code stored in memory 720 or process data, such as executing ship detection and tracking methods.

In some embodiments, the display 730 can be an LED display, a liquid crystal display, a touch LCD display, and an OLED (Organic Light Emitting Diode) touchscreen. The display 730 is used to display information on ship detection and tracking device, as well as to display a visual user interface. The components 710-730 of the ship detection and tracking device communicate with each other through the system bus.

In an embodiment, the steps in the ship detection and tracking method described above are implemented when the processor 710 executes the ship detection and tracking program 740 in the memory 720.

This embodiment also provides a computer-readable storage medium on which a ship detection and tracking program is stored. When the ship detection and tracking program is executed by the processor, the following steps are implemented:
  pre-training a yolov5s network model with a first preset number of high-speed moving object datasets to obtain an initial ship detection model, motion characteristics of the high-speed moving objects are similar to those of ships;

adding a preset attention mechanism to the initial ship detection model to obtain a transitional ship detection model;

based on a transfer learning strategy, inputting a second preset number of annotated ship datasets into the initial ship detection model with the preset attention mechanism for training to obtain a target ship detection model;

inputting an original ship video frame into the target ship detection model, and outputting the position information of the ship to be tracked;

based on a preset tracking algorithm, performing ship video image tracking on the ship to be tracked according to the position information.

In summary, the beneficial effects of this disclosure are: pre-training a yolov5s network model through high-speed moving object datasets to obtain an initial ship detection model suitable for target ship detection. Then, through a transfer learning strategy, only a small amount of annotated ship data is needed to train the improved initial ship detection model to obtain a target ship detection model with good generalization ability. Then, realizing video image tracking of the target ship by the original ship video and a preset tracking algorithm, which can accurately track the video image of the target ship when the annotated ship data is small.

It is to be understood, however, that even though numerous characteristics and advantages of this disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A ship detection and tracking method, comprising:

pre-training a yolov5s network model with a first preset number of high-speed moving object datasets to obtain an initial ship detection model, wherein motion characteristics of the high-speed moving objects are similar to those of ships, the high-speed moving object is a high-speed moving vehicle;

adding a preset attention mechanism to the initial ship detection model to obtain a transitional ship detection model;

based on a transfer learning strategy, inputting a second preset number of annotated ship datasets into the initial ship detection model with the preset attention mechanism for training to obtain a target ship detection model, comprising:

freezing feature extraction layer of the transition ship detection model and performing iterative trainings for a first preset number of times;

thawing the feature extraction layer of the transition ship detection model, and obtaining the target ship detection model by iterative trainings for a second preset number of times;

wherein in the first preset number of times of iterative trainings, weight parameters of all network layers except last Head layer are frozen, and only ownership weight parameters of Head detection head are updated to obtain an initial pre-trained weight model, in the next second preset number of times of iterative trainings, all feature extraction layers are thawed so that the yolov5s network model updates all the weight parameters;

inputting an original ship video frame into the target ship detection model, and outputting the position information of the ship to be tracked;

based on a preset tracking algorithm, performing ship video image tracking on the ship to be tracked according to the position information.

2. The ship detection and tracking method according to claim 1, based on a preset tracking algorithm, performing ship video image tracking on the ship to be tracked based on the position information, comprising:

using the Kalman filter algorithm to predict the position of the ship to be tracked according to the position information, and determining the track set of the ship to be tracked;

based on a cascade matching method, matching the ship track set to be tracked with a detection box, and returning a first matching result;

based on an IOU matching strategy, matching and filtering according to the first matching result, and returning a second matching result;

updating the track set of the ship to be tracked according to the second matching result, and tracking the next frame of ship video image.

3. The ship detection and tracking method according to claim 2, using the Kalman filter algorithm to predict the position of the ship to be tracked according to the position information, and determining the track set of the ship to be tracked, comprising:

determining whether the track of the ship to be tracked exists according to the position information through the Kalman filter algorithm;

if the track of the ship to be tracked exists, using the Kalman filter algorithm to predict the position of the ship to be tracked to obtain a priori track;

initializing and classifying the priori track to obtain the track set of the ship to be tracked.

4. The ship detection and tracking method according to claim 3, further comprising:

after obtaining the priori track, dividing the priori tracks into three states of Confirmed, Tentative, and Deleted;

initializing the states of all priori tracks as Tentative;

if there is no matching detection box detection, changing the track state into Deleted;

if the number of times that the track matches the detection box is greater than a threshold, changing the track state into Confirmed; and updating all tracks through the three states of Confirmed, Tentative, and Deleted.

5. The ship detection and tracking method according to claim 2, based on a cascade matching method, matching the ship track set to be tracked with a detection box, and returning a first matching result, comprising:

calculating a first cost matrix according to the track set of the ship to be tracked;

based on the preset matching method, matching the track set of the ship to be tracked with the detection box according to the first cost matrix, and obtaining the first matching result.

6. The ship detection and tracking method according to claim 5, based on an IOU matching strategy, matching and filtering according to the first matching result, and returning a second matching result, comprising:

calculating a second cost matrix of the track to be matched and the unmatched detection box according to the first matching result;

based on a preset matching method, matching the track to be matched and the unmatched detection box according to the second cost matrix;

deleting the area whose IOU is less than a preset threshold after matching, and obtaining the second matching result.

7. The ship detection and tracking method according to claim 5, wherein the first matching result are divided into three categories of matched track and matched detection box, unmatched track, and unmatched detection box.

8. The ship detection and tracking method according to claim 2, updating the track set of the ship to be tracked according to the second matching result, and tracking the next frame of ship video image, comprising:

updating the matched track state through the Kalman filter algorithm, and continuing to match the state of a failed track;

converting the unmatched detection box into an unmatched track, and adding the successfully matched track to the ship track set to be tracked;

updating the ship track set to be tracked, and performing the next frame of ship video image tracking until the target ship video image tracking is completed.

9. The ship detection and tracking method according to claim 2, further comprising:

calculating a confidence level, $$C_i^j = P_r(\text{object}) * IOU_{pred}^{truth}(\text{Class Probability} * IOU),$$

wherein Class Probability represents a probability $P_r$ (object) of whether a current box has an object, Class Probability indicates whether there is only a background or the object in the current box; $IOU_{pred}^{truth}$ represents that when the current box has an object, an area of a possible overlap between a predicted box and a real box of the object, $C_i^j$ represents a confidence rate of a j-th detection box of an i-th image grid.

10. An electronic device, comprising a memory and a processor, wherein:

the memory configured to store one or more programs which, when executed by the processor, cause the processor to:

pre-train yolov5s network model with a first preset number of high-speed moving object datasets to obtain an initial ship detection model, wherein motion characteristics of the high-speed moving objects are similar to those of ships, the high-speed moving object is a high-speed moving vehicle;

add a preset attention mechanism to the initial ship detection model to obtain a transitional ship detection model;

based on a transfer learning strategy, input a second preset number of annotated ship datasets into the initial ship detection model with the preset attention mechanism for training to obtain a target ship detection model, comprising:

freeze feature extraction layer of the transition ship detection model and perform iterative trainings for a first preset number of times;

thaw the feature extraction layer of the transition ship detection model, and obtain the target ship detection model by iterative trainings for a second preset number of times;

wherein in the first preset number of times of iterative trainings, weight parameters of all network layers except last Head layer are frozen, and only ownership weight parameters of Head detection head are updated to obtain an initial pre-trained weight model, in the next second preset number of times of iterative trainings, all feature extraction layers are thawed so that the yolov5s network model updates all the weight parameters;

input an original ship video frame into the target ship detection model, and output the position information of the ship to be tracked;

based on a preset tracking algorithm, perform ship video image tracking on the ship to be tracked according to the position information.

11. A non-transitory computer-readable storage medium, which is used to store programs or instructions that can be read by a computer, when the program or instruction is executed by a processor, causes the processor to perform a method, the method comprising:

pre-training a yolov5s network model with a first preset number of high-speed moving object datasets to obtain an initial ship detection model, wherein motion characteristics of the high-speed moving objects are similar to those of ships, the high-speed moving object is a high-speed moving vehicle;

adding a preset attention mechanism to the initial ship detection model to obtain a transitional ship detection model;

based on a transfer learning strategy, inputting a second preset number of annotated ship datasets into the initial ship detection model with the preset attention mechanism for training to obtain a target ship detection model, comprising:

freezing feature extraction layer of the transition ship detection model and performing iterative trainings for a first preset number of times;

thawing the feature extraction layer of the transition ship detection model, and obtaining the target ship detection model by iterative trainings for a second preset number of times;

wherein in the first preset number of times of iterative trainings, weight parameters of all network layers except last Head layer are frozen, and only ownership weight parameters of Head detection head are updated to obtain an initial pre-trained weight model, in the next second preset number of times of iterative trainings, all feature extraction layers are thawed so that the yolov5s network model updates all the weight parameters;

inputting an original ship video frame into the target ship detection model, and outputting the position information of the ship to be tracked;

based on a preset tracking algorithm, performing ship video image tracking on the ship to be tracked according to the position information.

* * * * *